Jan. 14, 1930. A. J. WEATHERHEAD, JR 1,743,413
VALVE
Filed Jan. 23, 1926 2 Sheets-Sheet 1
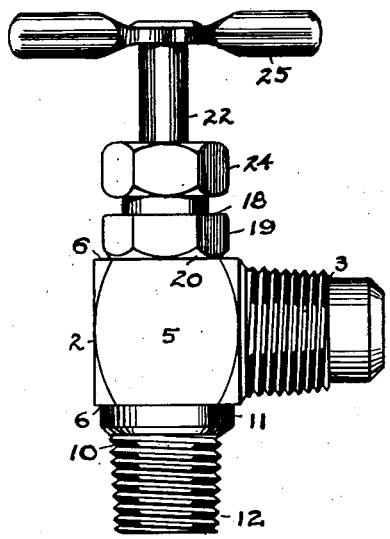
Fig. 1.
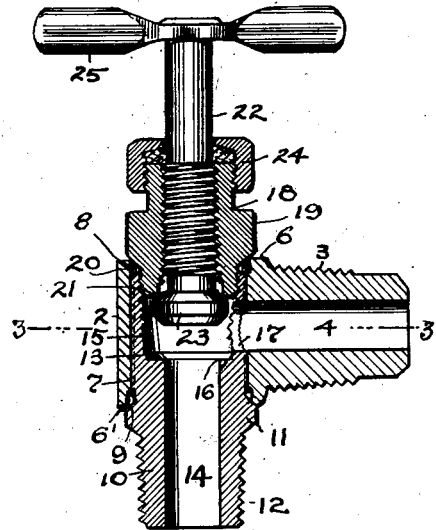
Fig. 2.
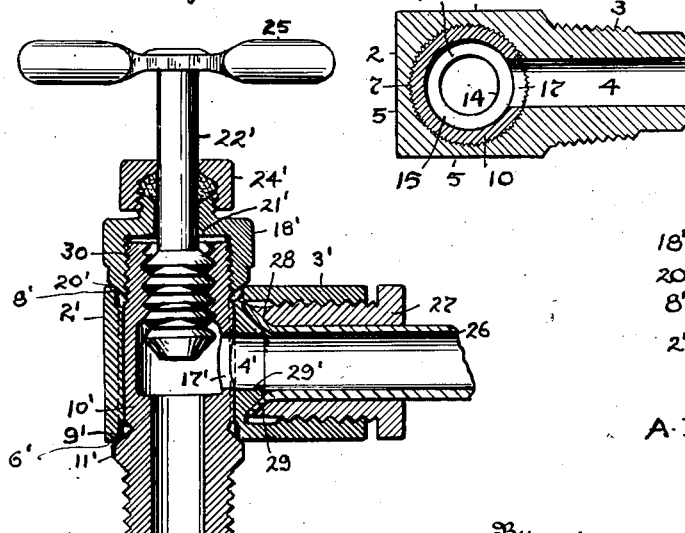
Fig. 3. Fig. 4.
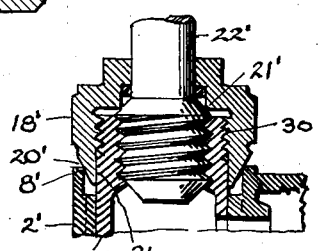
Fig. 4ª.
Inventor
A. J. Weatherhead Jr.
By Fisher Moser Tumoor
Attorney Jan. 14, 1930.  A. J. WEATHERHEAD, JR  1,743,413
VALVE
Filed Jan. 23, 1926  2 Sheets-Sheet 2
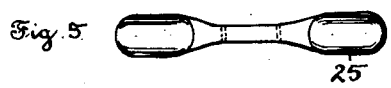
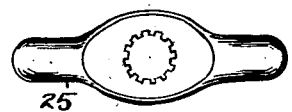
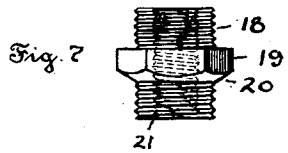
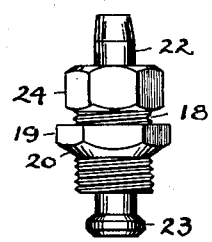
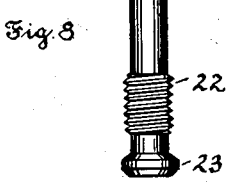
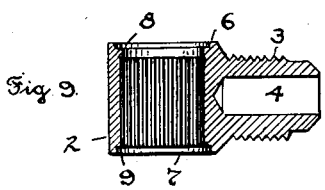
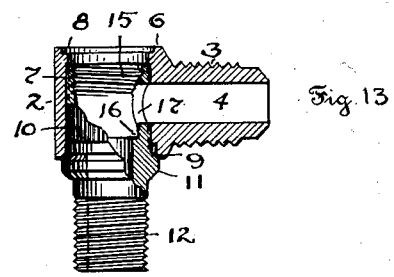
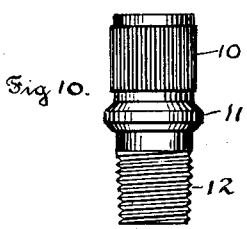
Inventor
A. J. Weatherhead Jr.
By Fisher, Moser & Moore
Attorney Patented Jan. 14, 1930

1,743,413

UNITED STATES PATENT OFFICE

ALBERT J. WEATHERHEAD, JR., OF CLEVELAND, OHIO

VALVE

Application filed January 23, 1926. Serial No. 83,189.

My invention relates to angle valves and a method of making the same, and in creating this invention my object in general has been to simplify the steps of producing a valve of angular formation; first, by making the valve body in separate pieces or parts so that each part may be accurately and cheaply produced in and by automatic screw machines; and second, by constructing all the pieces and valve members in a particular way to permit them to be readily assembled in operable union and with fluid-tight joints.

In the accompanying drawings Fig. 1 is an enlarged side elevation of a complete valve constructed according to my invention, and Fig. 2 is a sectional view thereof. Fig. 3 is a horizontal section of the valve on line 3—3 of Fig. 2. Figs. 4 and 4ª are sectional views of modified forms of the invention. Figs. 5 to 10, inclusive, discloses the various pieces or parts from which the cock is constructed; Fig. 5 being a side view of the handle; Fig. 6 a sectional view of the cap nut; Fig. 7 a side view of the bonnet or coupling nut; Fig. 8 a side view of the valve stem; Fig. 9 a sectional view of one body part partly completed; and Fig. 10 a side view of the inner body part or extension. Fig. 11 is a top view of the handle. Fig. 12 is a side view of the bonnet, cap nut, and valve stem assembled. Fig. 13 is a sectional view of the two body parts assembled and drilled to receive the bonnet and other members.

The cock or valve comprises a main body part 2 having a lateral branch or nipple 3 which may be screw-threaded either externally or internally as illustrated in Figs. 2 and 4, respectively. Branch 3 is drilled longitudinally to provide a water passage 4 which is in constant open communication with the valve chamber when the valve is completed. But in the steps taken to produce the valve body part 2 is cut to a given length from a square rod and given its desired shape in an automatic screw machine. Body part 2 may be shaped variously but as shown has flat sides 5 and flat ends 6—6', and a fluted or corrugated opening 7 extends axially through the body at right angles to passage 4. The opposite ends of opening 7 are recessed, or countersunk and the edges of the openings made either sharply angular or beveled to provide annular seating shoulders 8 and 9 within the flat ends 6—6', whereby such ends may be tightly sealed and the escape of fluid prevented after other parts of the valve are inserted and fastened in place. Thus, a second body part 10 is cut from rod stock and given a cylindrical form and fluted or corrugated externally over a part of its length, this fluted portion or belt 10, being made to fit tightly within fluted opening 7 in body part 2. In addition body part 10 has a beveled enlargement 11 annularly at its middle, or opposite one end of the fluted belt 10, to engage and seal end shoulder 9. The lower portion or end extension 12 of part 10 may be screw-threaded to permit the valve to be attached to a vacuum tank or any other container or appliance, and a small axial bore 14 extends through extension 12 and communicates with a larger counter bore or valve chamber 15 centrally within body part 10. The flat shoulder 13 at the base of chamber 15 provides a central valve seat with a sharp corner 16 beneath the plane of transverse opening 17 in the fluted side of body part 10, which side opening registers with the inner end of passage 4 in branch 3. Extension 3 of body part 2 is only drilled part way when first made, but after the two body parts 2 and 10 are fitted together passage 4 is extended by drilling through both fluted walls thereby producing side opening 17 in the inner member.

Part 10 is fastened within part 2 by a coupling member 18 having a hexagonal enlargement 19 at its middle. The opposite ends of member 18 are screw-threaded, and enlargement 19 is beveled at its base to provide a smooth annular seating surface 20 adapted to engage the corner edge 8 of the fluted opening in body 2 when the beveled enlargement 11 on body 10 is drawn against corner 9 at the opposite end of opening 7, thus coupling the parts tightly together with fluid-tight effect. The corner edges 8 and 9 may be beveled, but preferably are sharp to permit a tight bite to be obtained with beveled surface 20 and the beveled face of enlargement 11. Coupling member 18 in Fig. 2 has a screw-threaded bore axially therein which is adapted to receive a screw-threaded valve stem 22, the inner end of the stem having a valve head 23 which is beveled at top and bottom. When the valve head is raised its upper beveled surface engages a sharp-edged valve seat 21 at the bottom of member 18, and when the valve head is lowered its lower beveled surface bears against the sharp-edged valve seat 16. A cap nut 24 containing packing is attached to the outer end of member 18 to seal the joint around the stem, preferably by a spinning or pressing operation whereby the handle and stem are permanently fastened together.

Due to its sectional construction as described the cock or valve may be produced rapidly and cheaply. For example, the two body parts 2 and 10, respectively, may be formed separately and given their desired shapes and screw-threads by automatic screw-machine operations. The packing nut, coupling member, and the valve stem, may also be produced separately and automatically in such machines. The handle may be a pressed product, and the fluted opening in body part 2 and the corrugated surface on part 10 may be made by complementary broaching dies. Thus in the steps taken to produce the cock or valve, body part 2 is cut to lengths from a round or rectangular rod and turned to the desired shape and then drilled to provide two smooth bores at right angles. Preferably, the small bore or passage in branch 3 is not drilled clear through to the larger bore at this time, thus permitting broaching and corrugating or fluting operations on a smooth and unbroken wall. The end recesses for seats 8 and 9 may also be formed in drilling or boring operations. Similar steps are taken to produce cylindrical part 10 having the fluted part which may then be pressed into the fluted opening in part 2 to the limit as fixed by the beveled enlargement at its middle. Passage 4 in branch 3 may then be extended by drilling through the corrugated walls of the assembled parts 2 and 10, respectively. The valve stem, coupling member and handle are produced separately by automatic screw machine operations and the stem, coupling member and screw cap sleeved together prior to affixing the handle to the stem. The coupling member is then screwed into or upon the cylindrical part 10 until a tight sealing union is effected at both seats 8 and 9. The cock or valve is now completed.

An alternative construction and in some respects a preferred construction, is shown in Fig. 4. This valve comprises an assembly of elements closely akin to the other valve structure described but having a modified form of coupling member 18' at its top and a modified side extension 3' to permit a fluid-tight connection to be made with a supply or discharge pipe 26. Thus, extension 3' is screw-threaded internally to receive a screw-threaded bushing 27 having an inwardly beveled recess 28 at one end adapted to receive the flaring end flange 29 of pipe 26. When the bushing is inserted the flange is compressed and clamped against a conical projection 29 at the base of the screw-threaded opening in extension 3', and the opening in pipe 26 coincides with passage 4' extending axially through seating cone 29. A side opening 17' in inner body part 10' forms a continuation of passage 4' as in the other form of valve herein described, but the upper end of body part 10' is in this instance made longer and projects beyond the upper face of main body part 2' to permit a coupling member 18' having internal screw-threads to connect with external screw-threads 30 on body part 10'. In this form of valve the screw-threaded valve stem 22' is directly connected by screw-threads with body part 10', and only the cap nut 24' is screw-engaged with the bonnet or coupling member 18'. Notwithstanding these differences the coupling member 18' effects a fluid-tight union with body part 2' in substantially the same way as in the other form of the device because a beveled shoulder 20' is provided at the bottom edge of member 18' which impinges a sharp corner 8' on body part 2'. It may be noted that the sharp corner and beveled seat in this case is a mere reversal of the corresponding parts 8 and 20 shown in Fig. 2. Thus, in screwing coupling member 18' against corner 8' the fluted body part 10' is fastened tightly to main body part 2' because the beveled enlargement 11' is caused to impinge the sharp corner edge and seat 9' on the bottom face 6' of part 2'. The beveled end 20' of bonnet member 18' may also be made thinner, see Fig. 4ª, and sleeved over a smooth wall portion 31 at the base of screw-threads 30 on body 10', whereby the beveled end 20' may be compressed to fit tightly against the smooth wall portion 31 and a tight joint obtained with the inner body member 10' as well as with the outer body part 2'.

In Fig. 4, when valve head 23' is raised to its limit, its upper beveled extremity will engage the sharp corner edge 21' at the bottom of the bonnet or coupling member 18', thereby forming a fluid-tight joint around valve stem 22'. When the valve is in this wide open position the stem is sealed, and the joints at corners 8 and 9 of the two part body are also sealed, by metal to metal contacts.

What I claim, is:

1. A cock or valve, comprising a pair of body sections sleeved together at right angles having fluid passages intersecting each other, a coupling section adapted to draw said body sections in opposite directions tightly together, and a valve at the intersection of said passages having a screw stem extending through said coupling section, one of said body sections and said coupling section having beveled sealing surfaces adapted to effect a metal to metal sealing contact with the other body section when the said sections are drawn tightly together.

2. A cock or valve, comprising a body section having a transversely dentelated opening and a fluid passage at right angles therein, a second body section having a dentelated portion fitted within said transversely dentelated opening containing a fluid passage and a valve seat, a coupling member uniting said body sections together, and a valve opposite said seat having a screw stem extending through said coupling member.

3. A cock or valve, comprising a body section having an opening therein extending through opposite sides thereof and having a sharp cornered edge at each end and a screw-threaded branch having a passage extending at right angles to said opening, a cylindrical section fitted tightly within said opening extending through the opposite sides of said body section having a valve seat and a fluid passage therein and formed at one end with a beveled shoulder, a coupling nut connected with said cylindrical section having a beveled portion adapted to bear against said body section with drawing effect on said cylindrical section and a valve stem extending through said coupling nut opposite said valve seat.

4. A cock or valve, comprising a body section having an opening therein formed with sharp-edged seats at opposite ends thereof, a cylindrical body section fitted within said opening having a beveled seating shoulder adapted to engage one of said sharp-edged seats, a coupling member connected with said cylindrical body section having a beveled seating shoulder adapted to engage the other sharp-edged seat, said body sections having intersecting fluid passages and a valve within said passages having a stem extending through one of said parts.

5. A cock or valve, comprising a body section having a lateral screw-threaded extension containing a passage and formed with a narrowly-serrated opening at right angles to said extension, a dentelated cylindrical section fitted within said serrated opening having a valve seat and fluid passage and screw-threaded at its opposite ends, a coupling nut having screw-connection with one end of said cylindrical section and adapted to engage said body section, a valve opposite said seat having a screw stem extending through said coupling nut, and a packing nut for said stem.

6. A cock or valve, comprising a pair of body sections having correspondingly dentelated surfaces, and sleeved together on such surfaces, a coupling section uniting said pair of body sections tightly together, a valve having double beveled sealing surfaces and a screw stem extending through said coupling section, said coupling section having a sharp-edged seat adapted to be engaged by one of the beveled surfaces of said valve in opening movements thereof, and one of said body sections having a sharp-edged valve seat adapted to be engaged by the other beveled surface of said valve in closing movements thereof.

7. A cock or valve comprising a pair of body sections having dentelated uniting surfaces, a coupling member uniting said sections forcibly and rigidly, and a valve in one of said sections, said valve having an operating stem extending outwardly.

In testimony whereof I hereby affix my signature.

ALBERT J. WEATHERHEAD, JR.